United States Patent
Best et al.

(10) Patent No.: US 9,081,741 B2
(45) Date of Patent: Jul. 14, 2015

(54) MINIMIZING DELAY PERIODS WHEN ACCESSING MIRRORED DISKS

(71) Applicant: INTERNATIONAL BUSINESS MACHINES CORPORATION, Armonk, NY (US)

(72) Inventors: Steven F. Best, Groton, MA (US); Janice M. Girouard, Austin, TX (US); Robert E. Reiland, Raleigh, NC (US); Yehuda Shiran, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 13/899,392

(22) Filed: May 21, 2013

(65) Prior Publication Data

US 2014/0351626 A1      Nov. 27, 2014

(51) Int. Cl.
*G06F 11/00*       (2006.01)
*G06F 11/16*       (2006.01)

(52) U.S. Cl.
CPC ............ *G06F 11/1666* (2013.01); *G06F 11/16* (2013.01)

(58) Field of Classification Search
CPC ...................................................... G06F 11/16
USPC ............. 714/6.31, 6.32, 6.1, 6.23, 11–13, 6.3
See application file for complete search history.

(56) References Cited

U.S. PATENT DOCUMENTS

| | | | | |
|---|---|---|---|---|
| 5,680,539 | A * | 10/1997 | Jones | 714/6.21 |
| 6,859,890 | B2 * | 2/2005 | Humlicek et al. | 714/6.24 |
| 6,880,052 | B2 * | 4/2005 | Lubbers et al. | 711/162 |
| 7,363,399 | B2 | 4/2008 | Shum et al. | |
| 7,917,903 | B2 | 3/2011 | Lumb et al. | |
| 2006/0218360 | A1 * | 9/2006 | Burkey | 711/154 |
| 2008/0147920 | A1 | 6/2008 | Mohan et al. | |
| 2010/0011371 | A1 * | 1/2010 | Burkey | 718/105 |
| 2011/0246677 | A1 | 10/2011 | Johnson et al. | |

FOREIGN PATENT DOCUMENTS

WO       9934291       7/1999

OTHER PUBLICATIONS

Park, Hyang Jae et al., "Real-time Disk Scheduling Techniques for Mirrored Disk Systems," Proceedings of 1994 IEEE Region 10's Ninth Annual International Conference,Theme: Frontiers of Computer Technology, TENCON'94, pp. 474-480, IEEE, 1994.

* cited by examiner

*Primary Examiner* — Dieu-Minh Le
(74) *Attorney, Agent, or Firm* — Griffiths & Seaton PLLC

(57) ABSTRACT

Methods, apparatus and computer program products implement embodiments of the present invention that include arranging a first storage device and a second storage device to store data in a mirrored configuration. Upon a host processor receiving, in response to a first request conveyed to read the data from the first storage device, a message indicating that the first storage device is in an error recovery mode, the host processor can convey a second request to read the data from the second storage device. Upon receiving the data from the second storage device, the host processor can cancel the first request. Storage devices implementing embodiments of the present invention include hard disk drives and solid state disk drives.

15 Claims, 3 Drawing Sheets

MINIMIZING DELAY PERIODS WHEN ACCESSING MIRRORED DISKS

CROSS-REFERENCE TO RELATED APPLICATIONS

This application is related to U.S. Patent Application titled "Storage Device with Error Recovery Indication", filed on even date with the present application, and which is incorporated herein by reference.

FIELD OF THE INVENTION

The present invention relates generally to storage devices, and specifically to a storage device configured to convey an error recovery status.

BACKGROUND

In data storage, storage device mirroring replicates data stored on a first data storage device to a second data storage device, in order to ensure redundancy. For a storage system comprising a pair of storage devices, mirroring can be implemented either synchronously or asynchronously. During synchronous mirroring, a host communicating with the storage system receives a write acknowledgement after data is successfully written to both of the mirrored storage devices. During asynchronous mirroring, the host receives the write acknowledgement after the data is written to a first of the mirrored storage devices, and the data is written to a second of the mirrored storage devices at a later time.

The description above is presented as a general overview of related art in this field and should not be construed as an admission that any of the information it contains constitutes prior art against the present patent application.

SUMMARY

There is provided, in accordance with an embodiment of the present invention a method, including arranging a first storage device and a second storage device to store data in a mirrored configuration, conveying, by a host processor, a first request to read the data from the first storage device, and upon the host processor receiving, from the first storage device, a message indicating that the first storage device is in an error recovery mode, conveying a second request to read the data from the second storage device.

There is also provided, in accordance with an embodiment of the present invention an apparatus, including a first storage device and a second storage device arranged to store data in a mirrored configuration, and a host processor configured to convey a first request to read the data from the first storage device, and being further configured, upon the host processor receiving, from the first storage device, a message indicating that the first storage device is in an error recovery mode, to convey a second request to read the data from the second storage device.

There is further provided, in accordance with an embodiment of the present invention a computer program product, the computer program product including a non-transitory computer readable storage medium having computer readable program code embodied therewith, the computer readable program code including computer readable program code configured to arrange a first storage device and a second storage device to store data in a mirrored configuration, computer readable program code configured to convey, by a host processor, a first request to read the data from the first storage device, and computer readable program code configured, upon the host processor receiving, from the first storage device, a message indicating that the first storage device is in an error recovery mode, to convey a second request to read the data from the second storage device.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
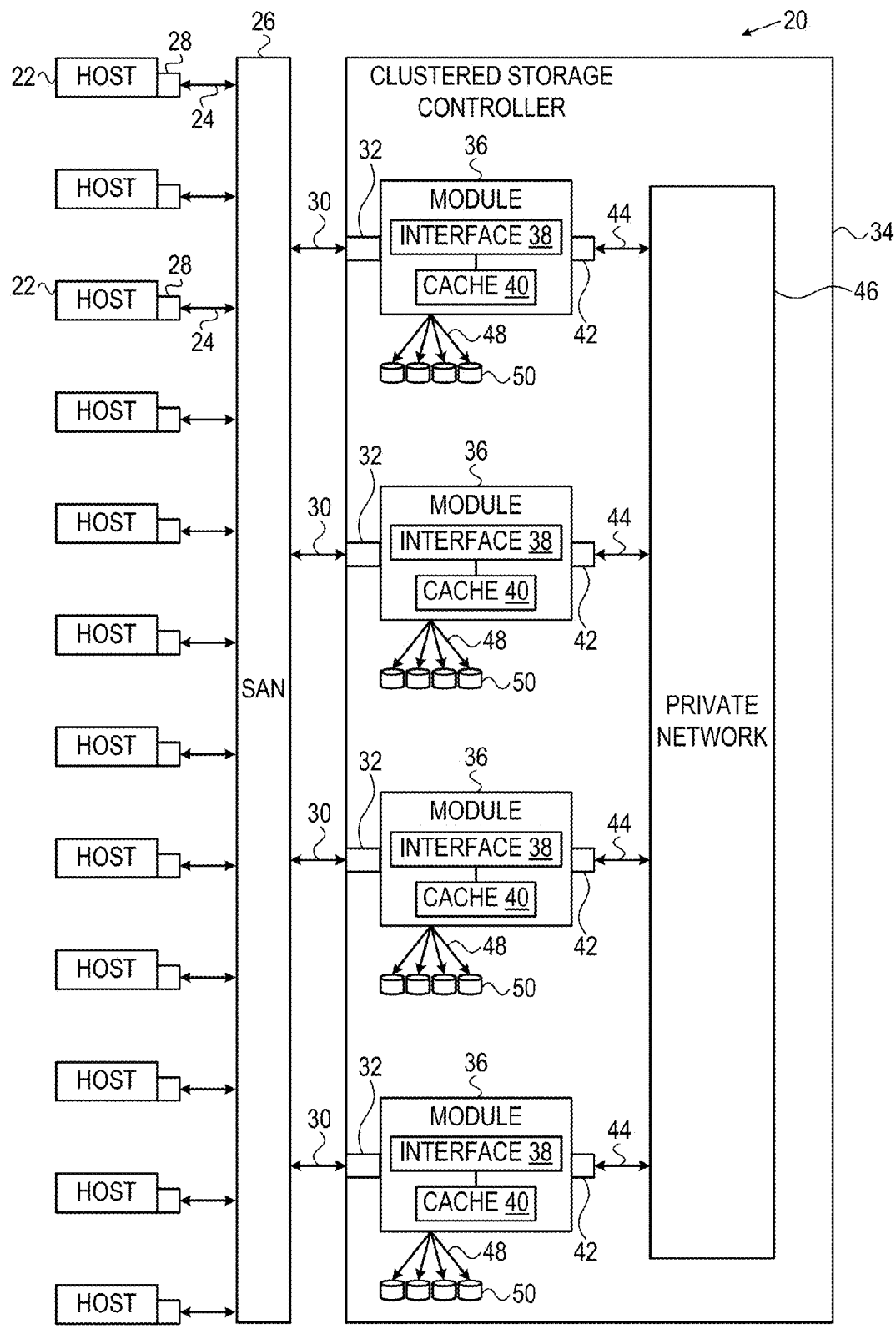
FIG. 1 is a block diagram that schematically illustrates a storage system, in accordance with an embodiment of the present invention.

Subsequent to processing input/output (I/O) requests over a period of time, a storage device (e.g., a hard disk) may detect problems such as adjacent track interference, which can impact the reliability of data stored on the storage device. Adjacent track interference can occur if a particular track of the storage device is written a large number of times (e.g., 30,000 times or more) without writing to any adjacent tracks. The large number of writes on the particular track may cause some magnetic flux interference on the adjacent tracks that, over many write cycles, can accumulate and leave the adjacent tracks unreadable. In other words, data stored on the adjacent tracks can become corrupted due to adjacent track interference. Various techniques for detecting and correcting storage device problems such as adjacent track interference are known in the art.

When a storage device detects a problem such as adjacent track interference, the storage device can enter an "error recovery mode", and execute one or more error recovery operations to correct the problem. While the storage device is in an error recovery mode, the storage device may receive, from a host processor, a request to perform an input/output (I/O) operation, and upon receiving the I/O request, the storage device can convey a message to the host processor indicating that the storage device is in an error recovery mode. A storage device configured to indicate an error recovery status is described in more detail in U.S. Patent Application "Storage Device with Error Recovery Indication", referenced above.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Embodiments of the present invention provide methods and systems for a host processor to convey read requests to a first storage device and a second storage device arranged to store data in a mirrored configuration. In some embodiments, upon a host processor conveying a first request to read the data from the first storage device and receiving, from the first storage device, a message indicating that the first storage device is in an error recovery mode, the host processor can convey a second request to read the data from the second storage device.

In additional embodiments, upon receiving, from the second storage device, an additional message indicating that the second storage device is in the error recovery mode, the host processor can determine that a first queue depth for the first storage device is greater than a second queue depth for the second storage device, and cancel the first read request. On the other hand, if the host processor determines that the second queue depth for the second storage device is greater than the first queue depth for the first storage device, then the host processor can cancel the second read request.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

Figure 2:
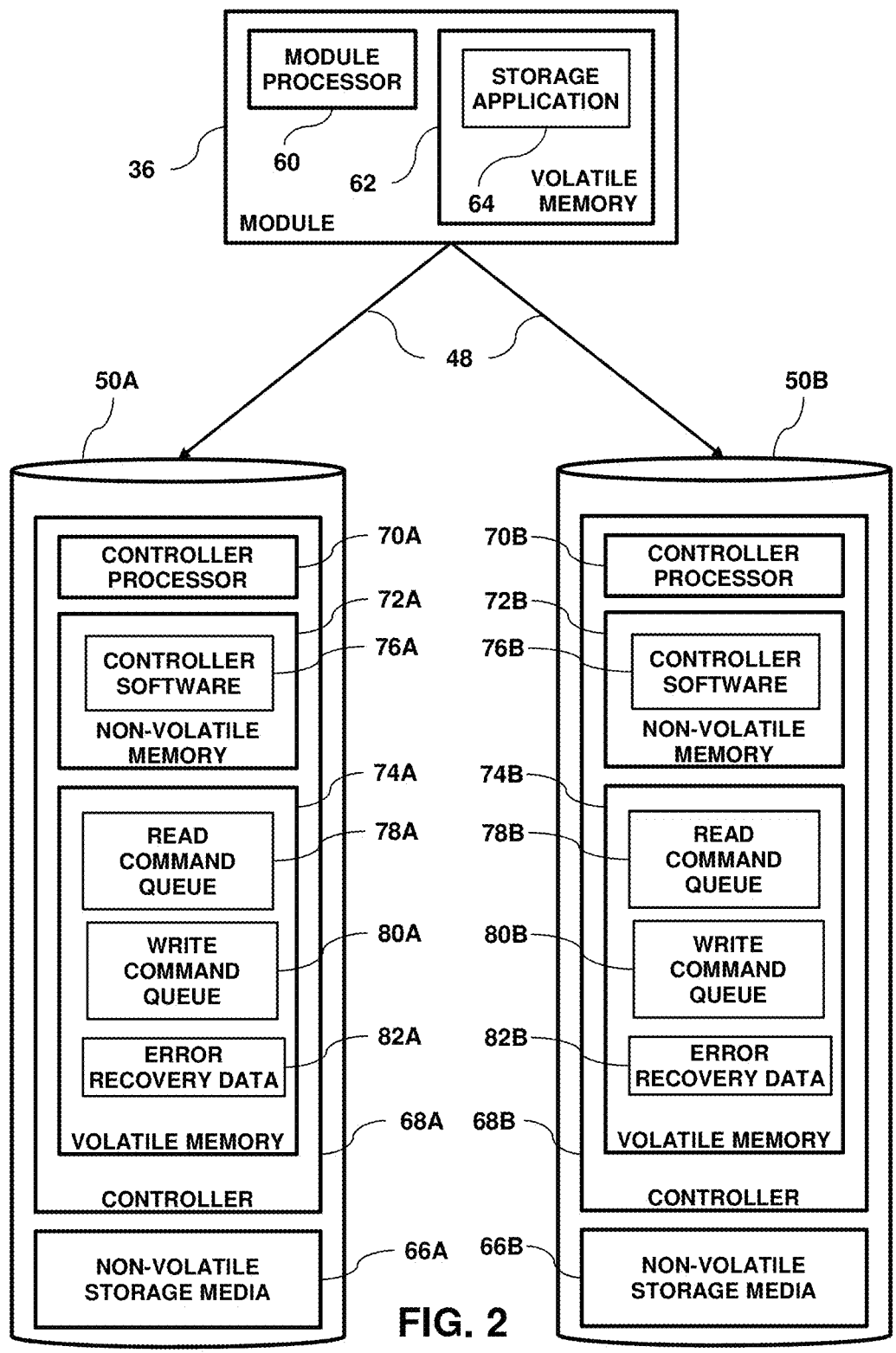
FIG. 2 is a block diagram of a module of the storage system coupled to a pair of mirrored storage devices configured to convey an error recovery status, in accordance with an embodiment of the present invention.

FIG. 2 is a block diagram of a given module 36 coupled to a pair of storage devices 50 configured to convey an error recovery status, in accordance with an embodiment of the present invention. In the description herein, storage devices 50 and their respective components may be differentiated by appending a letter to the identifying numeral, so that storage devices 50 comprise storage devices 50A and 50B. In embodiments described herein, storage devices 50A and 50B comprise a pair of mirrored storage devices 50 so that data written to storage device 50A can be mirrored to storage device 50B. Likewise, data written to storage device 50B can be mirrored to storage device 50A.

Module 36 comprises a module processor 60 (also referred to herein as a host processor) and a volatile memory 62. In operation, host processor 60 executes, from memory 62, a storage application 64 that is configured to convey input/output (I/O) requests to storage devices 50.

Storage device 50 comprises a non-volatile storage media 66 and a controller 68. Storage media 66 comprises non-volatile devices and/or materials configured to store data. Examples of storage media 66 include platters for a hard disk drive and non-volatile random access memory (NVRAM) modules for a solid state drive (SSD).

Controller 68 comprises a controller processor 70, a non-volatile memory 72 and a volatile memory 74. Controller processor 70 is configured to execute a controller application 76 from non-volatile memory 72 that enables module 36 to access (i.e., read/write) data on storage media 66 in order to process I/O requests received from module processor 60. In embodiments where storage device 50 comprises a hard disk, processor 70 executes controller application 76 to control motors (not shown) on the storage device, and to command disk heads (not shown) to read or write data.

Volatile memory 74 comprises a read command queue 78, a write command queue 80 and error recovery data 82. Upon receiving a read data request, controller processor 70 is configured to store the read data request to read command queue 78, and upon receiving a write data request, the controller processor is configured to store the write data request to write command queue 80. In operation, controller processor 70 is configured to retrieve read data requests from read command queue 78, retrieve the requested data from storage media 66, and convey the requested data to module processor 60. Likewise, controller processor 70 is configured to retrieve write data requests from write command queue 80, store the write request data to storage media 66, and convey a write completion acknowledgement to module processor 60.

Controller processor 70 is also configured to perform error recovery operations on storage media 66. For example, if storage device 50 comprises a disk drive comprising an analog/digital (A/D) converter coupled to a disk head having a magnetoresistive (MR) element, then examples of error recovery operations that controller processor 70 can perform include, but are not limited to:
  Changing an automatic gain control of the A/D converter.
  Positioning the disk head off-track in order to read data.
  Adjusting a bias value of the MR element.

While controller processor 70 is performing a given error recovery operation, storage device 50 is considered to be in an error recovery mode. Additionally, upon completing a given error recovery operation, controller processor 70 can calculate a historical average completion time for the given error recovery operation, and store a historical average completion time to error recovery data 82.

In operation, upon detecting a problem such as adjacent track interference, controller processor 70 can perform one or more error recovery operations in order to resolve the problem. In embodiments described herein, controller processor 70 can coordinate execution of the one or more error recovery operations with module processor 60. For example, if storage device 50 comprises a SCSI storage device, examples of interactions between module processor 60 and controller processor 70 include, but are not limited to:
  Upon receiving an I/O request from module processor 60, controller processor 70 can convey a Check Condition message indicating that storage device 50 is in an error recovery mode that comprises one or more error recovery operations.
  Once module processor 60 detects that storage device 50 is in an error recovery mode, the module processor can convey a Request_Sense command to controller processor 70, and the controller processor can responsively convey a message identifying the error recovery operation currently being performed on the storage device.
  Module processor 60 can convey an Abort Task command to controller processor 70 to cancel execution of an error recovery operation currently being performed on storage device 50.
  Subsequent to module processor 60 detecting that storage device 50 is in an error recovery mode, module processor 60 can convey an Inquiry command to controller processor 70 requesting the controller processor to identify the one or more error recovery operations that are scheduled to be performed while storage device 50 is in error recovery mode.
  As described supra, controller processor 70 can store an average completion time for each error recovery operation to error recovery data 82. Controller processor 70 can store error recovery data 82 to a SCSI mode page (not shown), and module processor 60 can query the SCSI mode page for an average completion time of a given error recovery operation.
  As described supra, controller processor 70 may perform several error recovery operations while storage device 50 is in an error recovery mode. Upon receiving a message indicating that storage device 50 is in an error recovery mode, module processor 60 can send a Mode Page Set command to define either which error recovery operations to perform or which scheduled error recovery operations to cancel.

Therefore, error recovery status information that controller processor 70 can convey to module processor 60 includes, but is not limited to, an identification of an error recovery operation currently executing on the controller processor, an identification of one or more additional error recovery operations scheduled for execution, and a historical average completion time for a given error recovery operation.

Processors 60 and 70 typically comprise general-purpose central processing units (CPU), which are programmed in software to carry out the functions described herein. The software may be downloaded to module 36, controller 68 and module 36 in electronic form, over a network, for example, or it may be provided on non-transitory tangible media, such as optical, magnetic or electronic memory media. Alternatively, some or all of the functions of processors 60 and 70 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

Input/Output Request Scheduling

Figure 3:
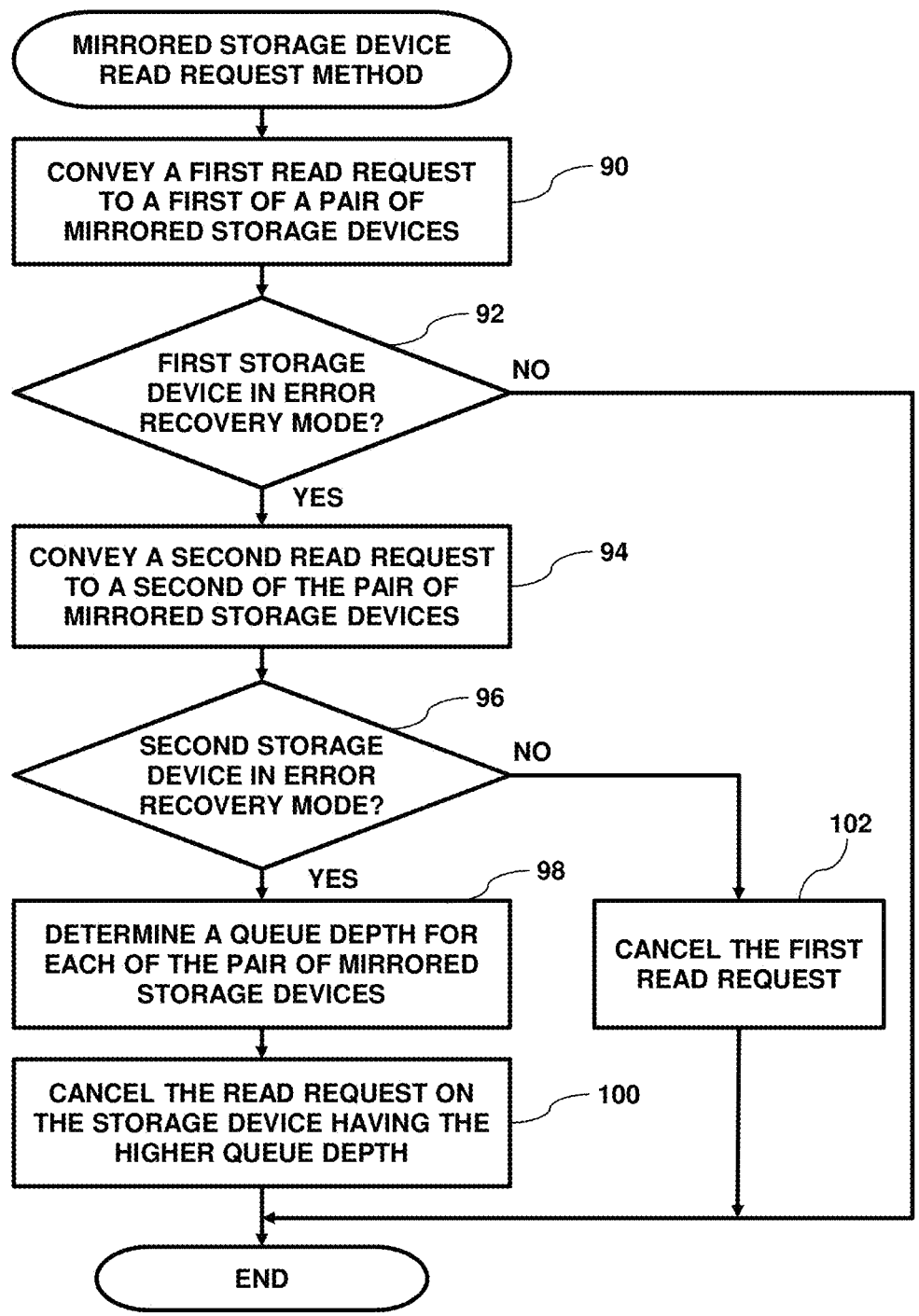
FIG. 3 is a flow diagram that schematically illustrates a method of reading data from a pair of mirrored storage devices configured to convey an error recovery status, in accordance with an embodiment of the present invention.

FIG. 3 is a flow diagram that schematically illustrates a method of reading data from a pair of mirrored storage devices that are configured to convey an error recovery status, in accordance with an embodiment of the present invention. In a first convey step 90, module processor 60 conveys a first read request to controller processor 70A to retrieve data from storage media 66A.

In a first comparison step 92, if controller processor 60 receives, from controller processor 70A, a message indicating that storage device 50A is in an error recovery mode, then in a second convey step 94, the controller processor conveys a second read request to controller processor 70B to retrieve the data from storage media 66B. In other words, since processor 60 mirrors data on storage devices 50A and 50B, the processor can read the same data from either storage device 50A or storage device 50B. Therefore, if host processor 60 conveys a read request to a first of the mirrored storage devices 50 (e.g., storage device 50A), upon receiving a message indicating that the first storage device is in an error recovery mode, the module can convey a second read request to read the data from a second of the mirrored storage devices (e.g., storage device 50B).

In a second comparison step 96, if host processor 60 receives, from controller processor 70B, an additional message indicating that storage device 50B is also in an error recovery mode, then in a determination step 98, the module processor determines a respective queue depth for each of the pair of mirrored storage devices, and finally, in a first cancellation step 100, the module processor cancels the read request conveyed to the storage device having the higher queue depth. In embodiments where storage device 50 comprises a SCSI storage device, host processor 60 can cancel a given read request by conveying an abrt_task command to the SCSI storage device.

In some embodiments, the queue depth for storage device 50 comprises a number of read requests in read command queue 78. In an alternative embodiment the queue depth for the storage device comprises a number of read requests in read command queue plus a number of write requests in write command queue 80 (i.e., all requests queued on the storage device). By canceling the read request conveyed to the storage device having the higher queue depth, the read request can be processed by the storage device having the lower queue depth, therefore enabling the read request to be completed in the least amount of time.

Returning to step 96, if host processor 60 does not receive an additional message indicating that storage device 50B is also in an error recovery mode, then in a second cancellation step 102, the host processor cancels the first read request on the first storage device, and the method ends. In some embodiments, host processor 60 can cancel the first read request upon receiving the data from the second storage device. Returning to step 92, if host processor 60 does not receive a message indicating that the first storage device is in an error recovery mode, then the host processor waits for the first storage device to perform the first read request, and the method ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
arranging a first storage device and a second storage device to store data in a mirrored configuration;
conveying, by a host processor, a first request to read the data from the first storage device;
upon the host processor receiving, from the first storage device, a message indicating that the first storage device is in an error recovery mode, conveying a second request to read the data from the second storage device; and
upon receiving an additional message indicating that the second storage device is in the error recovery mode, determining that a first queue depth for the first storage device is greater than a second queue depth for the second storage device and canceling the first request;
wherein the first queue depth for the first storage device is selected from a list comprising a first number of read requests queued on the first storage device and a second number of all requests queued on the first storage device and wherein the second queue depth for the second storage device is selected from a list comprising third number of read requests queued on the second storage device and a fourth number of all requests queued on the second storage device.

2. The method according to claim 1, and comprising canceling the first request upon receiving the data from the second storage device.

3. The method according to claim 1, and comprising upon receiving an additional message indicating that the second storage device is in the error recovery mode, determining that a first queue depth for the first storage device is smaller than a second queue depth for the second storage device, and canceling the second request.

4. The method according to claim 3, wherein the first queue depth for the first storage device is selected from a list comprising a first number of read requests queued on the first storage device and a second number of all requests queued on the first storage device, and wherein the second queue depth for the second storage device is selected from a list comprising a third number of read requests queued on the second storage device and a fourth number of all requests queued on the second storage device.

5. The method according to claim 1, wherein the storage device is selected from a list comprising a hard disk drive and a solid state disk drive.

6. The method according to claim 5, wherein the hard disk drive comprises a disk head having a magnetoresistive (MR) element configured to read and write data to and from the storage media, and coupled to an analog/digital (A/D) converter, and wherein the error recovery operation is selected from a list comprising changing an automatic gain control of the A/D converter, positioning the disk head off-track in order to read the data, and adjusting a bias value of the MR element.

7. A storage system, comprising:
a first storage device and a second storage device arranged to store data in a mirrored configuration; and
a host processor configured to:
convey a first request to read the data from the first storage device, and being further configured, upon the host processor receiving, from the first storage device, a message indicating that the first storage device is in an error recovery mode, to convey a second request to read the data from the second storage device; and
upon receiving an additional message indicating that the second storage device is in the error recovery mode, to determine that a first queue depth for the first storage device is greater than a second queue depth for the second storage device, and to cancel the first request
wherein the first queue depth for the first storage device is selected from a list comprising a first number of read requests queued on the first storage device and a second number of all requests queued on the first storage device, and wherein the second queue depth for the second device is selected from a list comprising a third number of read requests queued on the second storage device and a fourth number of all requests queued on the second storage device.

8. The storage system according to claim 7, wherein the host processor is configured to cancel the first request upon receiving the data from the second storage device.

9. The storage system according to claim 7, wherein the host processor is configured, upon receiving an additional message indicating that the second storage device is in the error recovery mode, to determine that a first queue depth for the first storage device is smaller than a second queue depth for the second storage device, and to cancel the second request.

10. The storage system according to claim 9, wherein the first queue depth for the first storage device is selected from a list comprising a first number of read requests queued on the first storage device and a second number of all requests queued on the first storage device, and wherein the second queue depth for the second storage device is selected from a list comprising a third number of read requests queued on the second storage device and a fourth number of all requests queued on the second storage device.

11. The storage system according to claim 7, wherein the storage device is selected from a list comprising a hard disk drive and a solid state disk drive.

12. The storage system according to claim 11, wherein the hard disk drive comprises a disk head having a magnetoresistive (MR) element configured to read and write data to and from the storage media, and coupled to an analog/digital (A/D) converter, and wherein the error recovery operation is selected from a list comprising changing an automatic gain control of the A/D converter, positioning the disk head off-track in order to read the data, and adjusting a bias value of the MR element.

13. A computer program product, the computer program product comprising:
 a non-transitory computer readable storage medium having computer readable program code embodied therewith, the computer readable program code comprising:
 computer readable program code configured to arrange a first storage device and a second storage device to store data in a mirrored configuration;
 computer readable program code configured to convey, by a host processor, a first request to read the data from the first storage device;
 computer readable program code configured, upon the host processor receiving, from the first storage device, a message indicating that the first storage device is in an error recovery mode, to convey a second request to read the data from the second storage device; and
 computer readable program code configured, upon receiving an additional message indicating that the second storage device is in the error recovery mode, to determine that a first queue depth for the first storage device is eater than a second queue depth for the second storage device, and canceling the first request
  wherein the first queue depth for the first storage device is selected from a list comprising a first number of read requests queued on the first storage device and a second number of all requests queued on the first storage device, and wherein the second queue depth for the second storage device is selected from a list comprising third number of read requests queued on the second storage device and a fourth number of all requests queued on the second storage device.

14. The computer program product according to claim 13, and comprising computer readable program code configured to cancel the first request upon receiving the data from the second storage device.

15. The computer program product according to claim 13, and comprising computer readable program code configured, upon receiving an additional message indicating that the second storage device is in the error recovery mode, to determine that a first queue depth for the first storage device is smaller than a second queue depth for the second storage device, and canceling the second request.

* * * * *